July 2, 1957 F. A. BEYER ET AL 2,797,776
FLUTTER DAMPER STRUCTURE
Filed Dec. 22, 1954 2 Sheets-Sheet 2
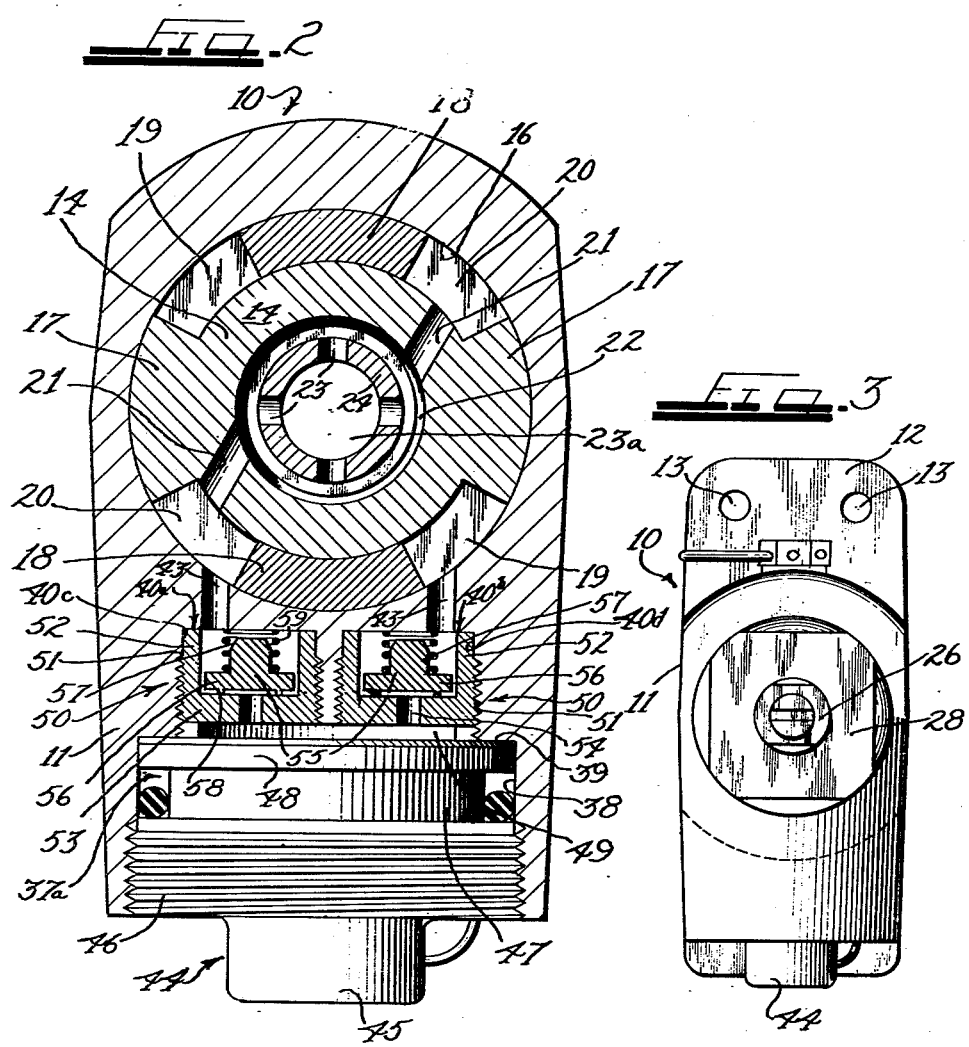
Inventors
Frederick A. Beyer
Benjamin Fuente United States Patent Office 2,797,776
Patented July 2, 1957

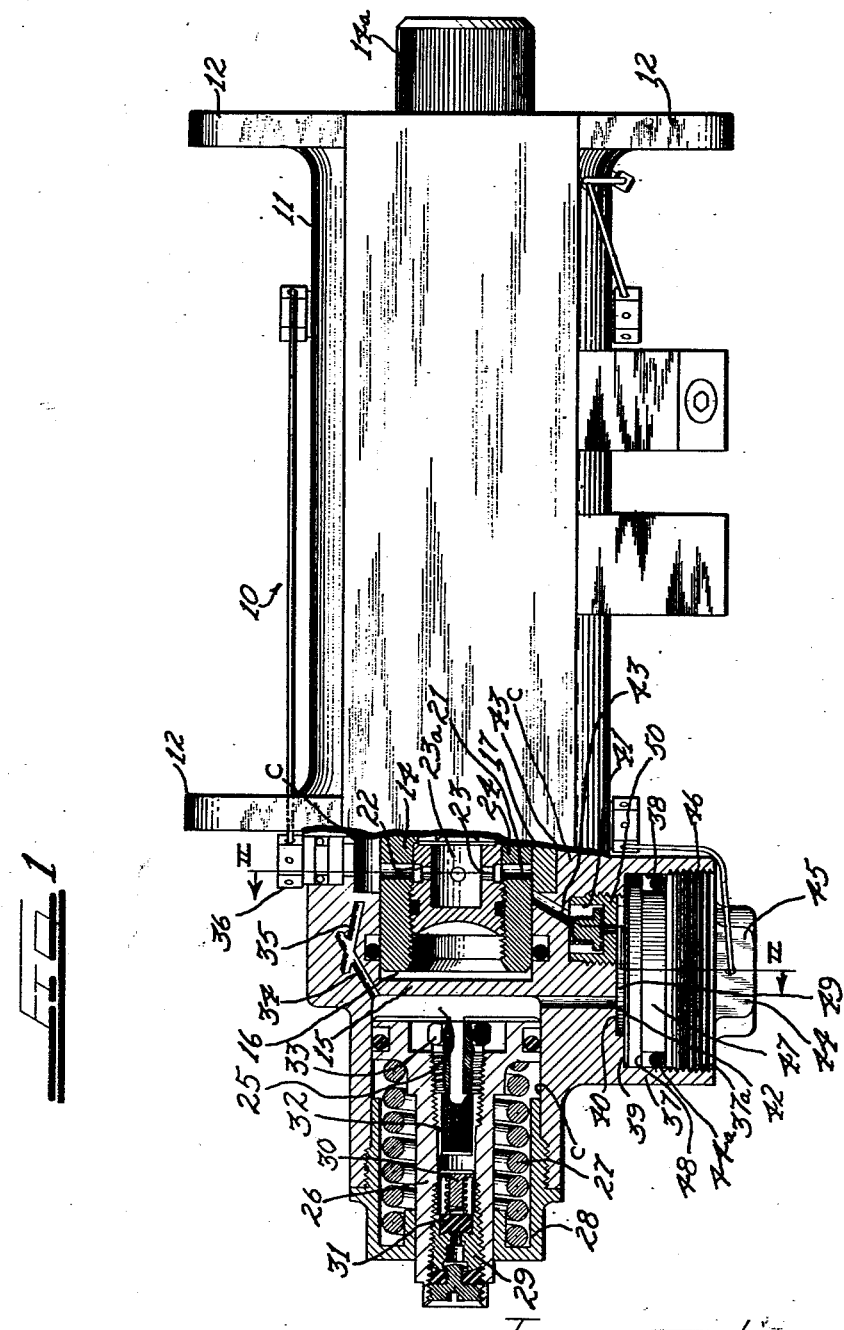

2,797,776

FLUTTER DAMPER STRUCTURE

Frederick A. Beyer, Detroit, Mich., and Benjamin Fuente, Cleveland, Ohio, assignors to Houdaille Industries, Inc., Detroit, Mich., a corporation of Michigan Application December 22, 1954, Serial No. 477,005

3 Claims. (Cl. 188—93)

The present invention relates to an improved damper structure and particularly relates to an expedient for providing fluid communication passages between various hydraulic fluid chambers in flutter dampers.

Most flutter dampers of the rotary vane piston type have, as a principal component, an elongated generally cylindrical housing, usually of small diameter, which defines an elongated cylindrical compartment. In flutter dampers of the self-replenishing type this compartment is usually divided or separated axially into a pair of chambers by a transverse partition. One chamber comprises a working chamber in which a rotary vane piston is disposed for rotatable damping action movement and the other chamber comprises a hydraulic fluid replenishing chamber or reservoir from which hydraulic fluid is fed to the working chamber as the supply of fluid therein becomes depleted through use. In order to effect this transfer of hydraulic fluid from the replenishng chamber to the working chamber suitable passages are provided around or through the partition dividing the chambers. Such passages are usually provided with a ball check valve which allows hydraulic fluid to flow unidirectionally from the replenishing chamber to the working chamber only and functions to prevent reverse flow.

At least two major limitations arise in providing fluid passages and valving means between the replenishing chamber and the working chamber of such flutter dampers. The first of these is the difficulty encountered in drilling or boring the passages. The second is the inability of ball check valves to operate efficiently consistently in preventing reverse flow-back or leak-by of hydraulic fluid from the working chamber to the replenishing chamber. As will be shown, however, the first limitation usually necessitates the use of such ball check valves.

The difficulties encountered in drilling or boring fluid flow passages between the respective chambers stem primarily from the size and shape of the housing employed in most rotary vane flutter dampers. Because of the close fitting relationship existing in an aircraft between a stationary airfoil member, such as a wing, stabilizer, or the like, and a movable control surface such as an aileron, elevator, wingflap, etc., it is desirable that a flutter damper housing have as small a diameter as is operably feasible. This reduction in housing size, however, reduces the diameter of the compartment or chambers defined by the housing. In practice it requires not only diminutive equipment but also considerable patience and time to drill fluid flow passage within the narrow, elongated confines of some flutter damper housings.

This limitation on drilling flexibility within relatively narrow, elongated flutter damper housings has more or less confined the formation of hydraulic fluid passages to relatively small diameter bores. Small diameter passages, though suitable for conducting fluid flow, tend to restrict the form of check valves which can be employed in association with such passages. Heretofore ball check valves have been found to be one of the few types of valves that could be employed with any degree of efficiency in checking hydraulic fluid flow from a working chamber to a replenishing chamber via small bore passages.

It is not uncommon, however, for ball check valves to vary widely in the efficiency of their valving actions. This is due primarily to the fact that optimum valving action occurs when the ball itself closely approaches the configuration of a perfect sphere and the ball seat has a substantially perfect, concave hemi-spherical shape allowing a close fitting seal relationship between the ball and seat.

As those skilled in the art will appreciate, however, forming ball check valves as perfect spheres is no mean task. Likewise, and even more significant, is the difficulty encountered in providing substantially perfect hemispherical ball seats within the narrow confines of small diameter rotary vane flutter dampers. The greater the variance of the ball and seat from perfect sphericity the greater the incidence of hydraulic fluid leak-by.

In accordance with the general features of the present invention a new and improved structure and method are provided whereby hydraulic fluid flow passages may be provided between chambers in a small diameter flutter damper in such a manner that the drilling or boring of such passages is effected primarily from outside the flutter damper housing and in which a relatively large disk valve assembly may be employed to replace the less efficient ball check valves used heretofore in controlling fluid flow between the chambers.

It is, therefore, an object of this invention to provide a method and structure for forming fluid flow passages between various chambers in a damper construction such that drilling or boring within the confines of the housing is eliminated.

A further object is to provide a method and structure whereby hydraulic fluid flow between various chambers in a small diametered damper is controlled by a disk valve assembly assuring optimum sealing against fluid leak-by.

Other objects, features and advantages of the present invention will be readily apparent from the following detailed description of a preferred embodiment thereof taken in conjunction with the accompanying sheets of drawings, in which:

Figure 1 is a schematic side elevational view with parts broken away and parts in section illustrating one embodiment of the novel fluid passages and valve structure of the instant invention;

Figure 2 is a view taken substantially on line II—II of Figure 1, and

Figure 3 is an end elevational view of the flutter damper shown in Figure 1.

By way of illustration the flutter damper, shown generally at 10, has as a component part, an elongated, generally cylindrical housing 11. The housing 11 is preferably of a sufficiently small diameter to be received in free working relation between an airplane airfoil assembly and a movable control surface, such as an aileron, elevator, wingflap, or the like. This allows the damper unit 10 to be mounted on a movable control surface coaxial with the hinge axis thereof. For this purpose the housing 11 is provided with preferably integrally carried attachment flanges 12 projecting therefrom and having apertures 13 therein adapted to receive mounting bolts or the like.

The flutter damper 10 is of the rotary vane hydraulic type operating on the principle of metered and valved controlled displacement of hydraulic fluid between working chambers, permitting relatively free intentional movement of the control surface but resisting sudden or rapid movements thereof. For this purpose the housing 11 defines a cylindrical compartment or chamber C. The cylindrical compartment C is divided axially into a pair of chambers by an imperforate, transverse partition 15 formed integrally with the housing adjacent one end thereof (Figure 1).

The housing 11 and the partition 15 define a working chamber 16 and a replenishing chamber or hydraulic fluid reservoir 25 on opposite sides of the partition 15.

The working chamber 16 is provided with a rotary wing shaft 14 which projects from one end of the housing 11. The projecting end portion of the wing shaft 14, such as at 14a, is serrated to receive suitable means for attaching the wing shaft to an airfoil assembly. This allows the wing shaft 14 to be held stationary to an airfoil member while the housing 11 is movable rotatably with swinging movements of a pivoted control surface, such as an aileron or the like.

Spaced inwardly from its outer extremity, the wing shaft 14 has thereon a pair of diametrically opposite laterally projecting and longitudinally extending vanes or wings 17 which, at their outer edges, conform to the cylindrical surface of the working chamber defined by the housing 11. The wings 17 cooperate with a pair of diametrically opposed abutment members 18 to divide the cylindrical working chamber 16 into two pairs of opposite working chambers 19 and 20.

The flutter damper 10 operates by the displacement or movement of hydraulic fluid between the opposite working chambers 19 and 20 during rotational movement of the wing shaft 14. Such displacement or movement of fluid between the working chambers is effected by means of passages or ports connecting the chambers. Such passages or ports include passages 21 extending between the working chambers 20 and an annular fluid distribution channel 22. A plurality of radially extending passages 23 provide communication between the annular fluid distribution channel 22 and a chamber 23a defined by a valve block 24 disposed within an axial bore in the wing shaft 14. Fluid is conducted from the chamber 23a in the valve block 24 through suitable passages to the opposite working chambers 19 in a well known manner and is controlled by suitable metering means.

As noted, the other chamber defined by the housing 11 and the partition 15 comprises a reservoir or replenishing chamber 25 obverse to the working chamber 16. The replenishing chamber 25 is adapted to function as a reservoir for storing additional hydraulic fluid under pressure which is fed to the working chamber 16 as the supply of fluid therein is depleted through use.

Means are provided for filling the replenishing chamber 25 with hydraulic fluid and maintaining the same therein under pressure. Such means include a piston 26 having an axial passage or bore therethrough. The piston 26 is adapted to be normally urged slidably toward the partition 15 by means of a coil compression spring biasing means 27 bottomed against the piston 26 and a closure cap or plug 28 provided to close the end of the housing. The plug 28 provides means defining a centrally disposed aperture therein adapted to accommodate sliding movement of the piston stem.

Hydraulic fluid is adapted to be fed into the flutter damper through the piston 26. For this purpose a check valve structure is provided within the outer end portion of the axial bore in the piston stem. The check valve structure includes a plug 29 threaded into an enlarged diameter outer portion of the piston bore and has an axial fluid passage therethrough. At the inner extremity of the passage in the plug 29 is mounted a spider member 30 providing a seat for a coiled compression spring, the opposite end of which drives a resilient block check valve member 31 into sealing relation against a convex seat disposed about the axial passage in the plug 29. This structure allows hydraulic fluid to be delivered from the outer end of the axial bore of the piston 26 through the check valve into the replenishing chamber 25; return of the hydraulic fluid being checked by the resilient check valve block 31. As hydraulic fluid is forced under pressure into the replenishing chamber 25, the piston 26 moves outwardly in opposition to the bias of the spring 27 which thereby maintains the fluid in the chamber 25 under pressure.

A wire or the like mesh filter cartridge or cylinder 32 is provided in the interior portion of the axial bore of the piston 26 and is removably held therein by a supporting plug 33 threadedly disposed in the inner extremity of the piston bore. The filter 32 minimizes the introduction of contaminant material into the replenishing chamber 25 and is adapted to be removed for cleaning or replacing when necessary.

An air bleed passage 34 extends angularly upwardly from the top of the replenishing chamber 25 into the housing 11 and communicates with an air bleed passage 35 extending angularly upwardly from the top of the upper abutment member 18. The passage 35 is in communication with a small scratch located on the face of the upper abutment 18, whereby air collecting in the flutter damper rises to the top of the abutment 18 and through passages 35 and 34 and collects in replenishing chamber.

In accordance with the instant invention unidirectional hydraulic fluid flow from the replenishing chamber 25 to the working chamber 16 is effected efficiently by means of a novel passage structure and improved check valve means disposed within an enlarged boss portion 37 projecting radially integrally from the housing 11 axially on either side of the partition 15. Such means include a relatively large, counterbored recess 37a formed in the boss 37 and defined by a cylindrical side wall 38, a radially inwardly extending shoulder 39 and a stepped, counterbored portion 40 having a smaller diameter than the inner diameter of the wall 38.

A plurality of smaller recesses are provided in the bottom of the larger recess 37a for receiving check valve means. In the embodiment shown in Figure 2 such smaller or second recesses comprise a pair of smaller recesses 40a and 40b formed in the counterbored portion 40 of the first, larger recess 37a and defined therein by cylindrical side walls 40c and 40d, respectively.

A radially extending first passage 42 is provided for fluid communication between the counterbored portion 40 of the recess 37a and the replenishing chamber 25. Likewise, a second passage 43 is formed between the bottom of each of the second, smaller recesses 40a and 40b and the working chamber 16. In this manner fluid communication is provided between the working chamber 16 and the reservoir 25.

A closure cap or plug 44 is provided to closingly seal the first, larger recess 37a in the boss 37. The plug 44 includes an externally projecting, wrench-engaging outer portion 45, a threaded, boss-engaging portion 46, a reduced diameter, intermediate shank portion 47, and an inner extremity, annular, lateral integral sealing flange portion 48, which is adapted to be seated against the annular shoulder 39 in tight fitting relationship thereto. An O-type, resilient seal ring 44a is provided between the inner periphery of the boss side wall 38 and the outer periphery of the hank portion 47 to effect a tight fluid seal against the outflow of hydraulic fluid past the annular, lateral sealing flange 48.

The shoulder 39 holds the inner end of the plug 44 in spaced relation to the bottom of the stepped, counterbored portion 40 of the larger recess 37a. This space, as at 49 provides fluid communication between the first passage 42 and the second, smaller recesses 40a and 40b which in turn communicate with the second passages 43.

Check valve means are provided in the second, smaller recesses 40a and 40b to allow unidirectional flow of hydraulic fluid only from the replenishing chamber 25 to the working chamber 16. In the embodiment shown in the drawings, such check valve means preferably comprise a disk valve assembly 50. The disk valve assembly 50 includes a disk valve retaining member 51 having an annular, threaded side wall 52 and integral bottom wall 53. A generally, centrally disposed reduced diameter metering port 54 provides communication between the fluid flow space 49 and the interior of the disk valve assembly.

A disk valve 55 is disposed within the space defined by the annular side wall 52 of the disk valve retaining member 51. The disk valve 55 includes an annular disk member 56 having a shank portion 57 projecting radially unilaterally therefrom, and an annular sealing surface 58 depending therefrom obverse to the shank 57. The annular sealing member 58 is normally urged against the inner surface of the bottom wall 53 by a coil spring 59 compressed between the bottom wall of the second recess and the upper surface of the disk 56.

In operation hydraulic fluid will not flow between the replenishing chamber 25 and the working chamber 16 when the hydraulic pressure in the working chamber 16 is at least equal to or greater than the pressure exerted on the fluid by the piston 26 in the replenishing chamber 25. When the pressure on the fluid in the working chamber 16 diminishes through depletion of the fluid supply therein, the pressure on the hydraulic fluid in the replenishing chamber 25 will become sufficiently great to overcome the biasing strength of the coil spring 59 holding the disk valve 55 in closed sealing relationship. When this occurs the valve 55 is forced opening allowing flow of hydraulic fluid from the replenishing chamber 25 through the first passage 42 and the fluid flow space 49 into the disk valve assembly and thence into the working chamber 16 via the second passages 43. The biasing action of the coil spring 59 and the structural shape of the valve 55 in regard to reverse flow of fluid, however, effectively precludes any flow-by of hydraulic fluid from the working chamber 16 to the replenishing chamber 25.

Disk valves such as 55 are materially more efficient than ball check valves in that the depending, narrow integral contact-limiting annular rib or flange 58 can easily be machined to insure full sealing contact with the inner surface of the bottom portion 53 of the disk valve unit and prevent return flow of hydraulic fluid into the passage 54. Increased pressures within the working chamber 16 do not decrease the efficiency of the valve, but rather merely increase the sealing pressure exerted against the depending annular sealing flange 58 which in turn, increases the tightness of the seal. On the other hand, the virtually fine line fluid sealing contact afforded by the sealing rib 58 avoid danger of sticking of the valves against replenishment flow.

The manner in which hydraulic fluid flow passages are provided between the reservoir or replenishing chamber 25 and the working chamber 16 by the method of the instant invention is, indeed, highly simplified as compared to the arduous methods employed heretofore. In providing such passages in the present invention, the entire operation is performed primarily from outside the confines of the housing 11. In addition, most of the drilling or boring, is performed generally radially at right angles to the longitudinal axis of the housing 11. The formation of the relatively large counterbored first recess 37a permits easy boring of the second smaller recesses 40a and 40b and also permits easy drilling of the fairly short passages 42 and 43.

It will be understood that modifications and variations may be effected without departing from the scope of the novel concepts of the present invention.

We claims as our invention:

1. In a flutter damper construction including an elongated housing defining a cylindrical chamber divided axially into a working chamber and a hydraulic fluid replenishing chamber by a transverse partition and having a boss portion projecting radially therefrom axially on either side of said partition, means defining a relatively large first recess in said boss extending axially on either side of said partition in spaced relation thereto, means defining a plurality of smaller second recesses in said first recess, means defining a first passage between said first recess and the replenishing chamber, means defining a passage between each of the said second recesses and the working chamber, valve means carried in each of said second recesses for allowing unidirectional fluid flow between the chambers, and means in said first recess for sealingly closing the same.

2. In a flutter damper construction of the character described including an elongated cylindrical housing defining a cylindrical chamber divided axially into a working chamber and a hydraulic fluid reservoir by a transverse partition adjacent one end thereof and having a boss portion projecting radially therefrom axially on either side of said partition, means defining a relatively large first recess in said boss having a diameter sufficient to extend axially on either side of said partition in spaced relation thereto, means defining a plurality of smaller second recesses in the bottom of said first recess, means defining a first passage between the bottom of said first recess and the reservoir, means defining a passage between the bottom of each of said second recesses and the working chamber, a disk valve assembly carried in each of said second recesses adapted to restrict fluid flow to unidirectional flow from the reservoir to the working chamber, and a plug positioned in said first recess in spaced relation to the bottom thereof for sealingly closing said first recess and providing communication between said first passage and the disk valve assemblies.

3. In a flutter damper of the character described, an elongated housing having a cylindrical working chamber therein, a transverse wall defining an end of said working chamber, a rotary piston carried within said working chamber, spaced dividers in said working chamber having slidable engagement with said piston and cooperating therewith to define said working chamber into a plurality of chambers of increasing and decreasing volumes upon operation of the damper, a replenishing chamber within said housing on the opposite side of said wall from said working chamber, a piston within said replenishing chamber, spring means biasing said piston toward said wall for maintaining pressure on the fluid therein, means accommodating the filling of said replenishing chamber with fluid through the center of said piston, a hollow boss extending laterally from said housing, the hollow interior of which extends to opposite sides of said wall, a passageway from said replenishing chamber to the hollow interior of said boss, spaced passageways from the hollow interior of said boss opening into said working chamber on opposite sides of one of said dividers, and a check valve in each of said last mentioned passageways at right angles to said replenishing chamber and accommodating the passageway of fluid under pressure from said replenishing chamber to said working chambers and blocking the back flow of fluid to the hollow interior of said boss.

References Cited in the file of this patent
UNITED STATES PATENTS

| | | |
|---|---|---|
| 2,016,591 | Chapin | Oct. 8, 1935 |
| 2,419,651 | Magrum | Apr. 29, 1947 |

FOREIGN PATENTS

| | | |
|---|---|---|
| 56,953 | Switzerland | Oct. 6, 1910 |